United States Patent [19]

Wunning

[11] Patent Number: 5,570,679
[45] Date of Patent: Nov. 5, 1996

[54] INDUSTRIAL BURNER WITH LOW $NO_x$ EMISSIONS

[76] Inventor: Joachim Wunning, Berghalde 20, D-71229 Leonberg, Germany

[21] Appl. No.: 450,012

[22] Filed: May 25, 1995

[30] Foreign Application Priority Data

Jun. 2, 1994 [DE] Germany .............. 44 19 332.7

[51] Int. Cl.⁶ .................................................. F24C 3/00
[52] U.S. Cl. .................. 126/91 A; 431/158; 431/166; 431/1; 431/215
[58] Field of Search .................................. 431/158, 166, 431/1, 215; 126/91 A

[56] References Cited

U.S. PATENT DOCUMENTS

| | | |
|---|---|---|
| 1,533,639 | 4/1925 | Ehn . |
| 3,294,599 | 12/1966 | Huseby . |
| 3,782,705 | 1/1974 | Westeren et al. . |
| 4,171,126 | 10/1979 | Zahn et al. . |
| 4,586,894 | 5/1986 | Wünning . |
| 4,596,610 | 6/1986 | Kühn . |
| 4,634,103 | 1/1987 | Schmetz et al. . |
| 4,653,732 | 3/1987 | Wünning et al. . |
| 4,867,808 | 9/1989 | Heilmann et al. . |
| 4,877,396 | 10/1989 | Wunning .................. 431/166 |
| 4,906,182 | 3/1990 | Moller . |
| 5,154,599 | 10/1992 | Wünning . |
| 5,344,310 | 9/1994 | Harbeck et al. .................. 431/158 |
| 5,443,040 | 8/1995 | Kaji et al. .................. 126/91 A |

FOREIGN PATENT DOCUMENTS

| | | |
|---|---|---|
| 0343746 | 11/1989 | European Pat. Off. . |
| 0463218A1 | 1/1992 | European Pat. Off. . |
| 1994034 | 9/1968 | Germany . |
| 3422229A1 | 12/1985 | Germany . |

*Primary Examiner*—Carroll B. Dority
*Attorney, Agent, or Firm*—Frishauf, Holtz, Goodman, Langer & Chick, P.C.

[57] ABSTRACT

An industrial burner with low $NO_x$ emissions, particularly for heating furnace chambers of industrial furnaces, has a high-heat-resistance combustion chamber (9), which is formed with a fuel supply device and an air supply device and with at least one nozzle-shaped outlet (10) for the gases emerging into a heating chamber. The fuel supply device (17, 18) extends through the combustion chamber, which is acted upon constantly with air. The fuel supply device can be switched over between two operating states, with a differing three-dimensional location of fuel nozzle devices (25, 26) relative to the combustion chamber outlet. In a first operating state, fuel is introduced into the combustion chamber, creating a fuel/air mixture that burns with a stable flame in the combustion chamber, and in a second operating state, the reaction between the fuel and the combustion air is substantially shifted into the heating chamber.

21 Claims, 5 Drawing Sheets

INDUSTRIAL BURNER WITH LOW NO$_x$ EMISSIONS

Reference to related patents, the disclosures of which are hereby incorporated by reference:

U.S. Pat. No. 4,586,894, Wünning
U.S. Pat. No. 4,653,732, Wünning et al
U.S. Pat. No. 5,154,599, Wünning
U.S. Pat. No. 1,533,639, Ehn
U.S. Pat. No. 3,294,599, Huseby
U.S. Pat. No. 3,782,705, Westeren et al
U.S. Pat. No. 4,171,126, Zahn et al
U.S. Pat. No. 4,596,610, Kühn
U.S. Pat. No. 4,634,103, Schmetz et al
U.S. Pat. No. 4,867,808, Heilmann et al
U.S. Pat. No. 4,906,182, Moller

FIELD OF THE INVENTION

The invention relates to an industrial burner with low NO$_x$ emissions, in particular for heating furnace chambers in industrial furnaces with a high-heat-resistant combustion chamber, which is embodied with a fuel supply device and an air supply device and with at least one nozzle-shaped outlet for the gases emerging at high velocity into a heating chamber, and with an ignition device for a fuel/air mixture formed in the combustion chamber.

BACKGROUND

For converting fuel energy into heat, so-called impulse or high-velocity burners are increasingly used. The fuel and the combustion air are mixed with one another and ignited in a high-heat-resistant combustion chamber, which is typically made of ceramic material. The resultant hot combustion gases flow at high velocity through a nozzle-shaped outlet into the heating chamber, which is formed either by the furnace chamber itself or by the interior of radiator heating tube. The outlet of the combustion chamber can be constricted in nozzle-like fashion or formed by a nozzle ring; the axes of the nozzle openings may be parallel to one another or may be oriented divergently from one another. The mechanical energy of the gas stream or jet emerging from the combustion chamber, which derives predominantly from the fuel, serves to mix and circulate the gases in the heating chamber, which in turn promotes the temperature equalization in a desired manner. As the development of ceramic material for heavy-duty combustion chambers progresses, impulse burners today are employed even at process temperatures above 800° C.; as a rule, the combustion air is preheated to improve the efficiency, and this is done for example in a preceding recuperator, often in the form of a tubular ribbed recuperator.

A low-pollution industrial burner with this basic design is known from U.S. Pat. No. 4,586,894, claiming the priority of German Patent 34 22 229. The thermal nitrogen oxide (NO$_x$) formation is reduced by intensive mixing of the flame gases with relatively cold furnace gases (known as internal recirculation), and the effect is increased by supplying air in graduated fashion, as described in detail in this reference. Despite these provisions, in burners of this type, with air preheating of 600° C., NO$_x$ emissions can rise above the 200 ppm mark, which is thus in the vicinity of the legal limit.

A further lowering of NO$_x$ emissions is enabled, conversely, by a more recent impulse burner (U.S. Pat. No. 5,154,599, claiming the priority of European Patent 0 463 218), in which once the ignition temperature in the heating chamber is reached, the combustion air is switched over entirely to an external nozzle ring, and consequently no further combustion occurs in the combustion chamber. For a specified nozzle geometry, extremely low NO$_x$ values can then be attained (below 10 ppm). With externally preheated air, however, two hot air valves are needed in this burner, while in the version as a recuperator and regenerator burner, the combustion air, in the heating-up mode, does not flow via the heat exchangers.

A burner with reduced NO$_x$ emissions and with a switchover of fuel delivery to convert the burner from the cold startup mode to the normal operating mode is known from European Patent EP-A1 0 343 746. This burner does not employ a combustion chamber; instead, the arrangement provides air and fuel supply means that discharge at a certain lateral distance from the inner wall of the furnace. Until the ignition temperature is reached, or in other words in the startup mode, the fuel is introduced into the air supply line at a distance from its mouth; once the operating temperature in the furnace chamber is reached, the switchover is made to fuel nozzles, which are located at a predetermined distance laterally from the mouth of the air supply line (EN) in the inner wall of the furnace. According to the specification and drawing, this burner has no characteristics are a prerequisite for a impulse burner, namely a nozzle outlet for the combustion air, which makes up the primary component of the mass flow. Even during the startup mode, or in other words upon heating up to the ignition temperature, combustion already takes place essentially in the furnace chamber. The burner is not arranged for operation with an integrated recuperator or regenerator.

THE INVENTION

The object of the invention is to create an industrial burner designed as a impulse burner, in which the thermal NO$_x$ development is largely suppressed, and which with low NO$_x$ emissions is distinguished by a low expenditure for apparatus; the engineering principle employed can be applied if need be to burners with an integrated recuperator or regenerator.

Briefly, the industrial burner is characterized in that the fuel supply device, extended through the combustion chamber acted upon permanently by air can switch fuel between two nozzle arrangements located at different locations relative to a nozzle-shaped outlet of the combustion chamber. In a first operating state, with fuel supplied to one nozzle arrangement, fuel can be introduced into the combustion chamber, producing a fuel/air mixture that at least partly burns in the combustion chamber with a stable flame. In a second operating state, and with fuel supplied to the other nozzle arrangement, and at temperature in the heating chamber located above the ignition temperature of the fuel/air mixture, the reaction between the fuel and the combustion air emerging at high outlet impetus from the combustion chamber outlet is substantially suppressed inside the combustion chamber and shifted into the heating chamber. At least upon by the air supply device with such a high air through out that by means of the combustion air emerging from the nozzle-shaped outlet of the combustion chamber, combustion exhaust gases from the heating chamber can be aspirated by injector action and admixed with the combustion air.

This novel pulse burner has its own combustion chamber with an ignition device and a constricted nozzle outlet for the gases or combustion air flowing out into the heating chamber. Once the ignition temperature iN the heating chamber (approximately 600° to 800° C.) is exceeded, the impulse burner is put into the normal operating mode by switchover of the fuel supply; in this mode, the high outlet impetus, particularly of the combustion air from the combustion chamber, is maintained, but the reaction of the fuel and air in the region upstream of the nozzle outlet in the combustion chamber is largely suppressed and is shifted into the heating chamber.

Very simple structural conditions are attained if the combustion chamber is acted upon with all the combustion air from the air supply device. Depending on the intended use, however, versions are also conceivable in which a (smaller) proportion of the combustion air is made to bypass the combustion chamber in the first and/or the second operating state.

For the sake of a favorable design in terms of simplicity of apparatus, the fuel supply device may have two fuel nozzle devices; a first nozzle device discharges inside the combustion chamber, spaced apart from its outlet, and the second nozzle device discharges inside or outside the combustion chamber in the vicinity of the outlet. Valve means are assigned to each of the two fuel nozzle devices. For that purpose, the two fuel nozzle devices can be formed on two concentric fuel lances. The outer fuel lance, for example, leads to radially oriented fuel nozzles, which bring about a stable flame combustion inside the combustion chamber. The inner fuel lance, conversely, discharges in a fuel nozzle that preferably has an axially oriented outlet opening. The combustion in the second operating state therefore essentially does not take place until after the outlet from the combustion chamber. Along with the mixing of fuel and air by the stream impetus, combustion exhaust gas is at the same time aspirated from the heating chamber into the air/fuel stream, thus lowering the reaction temperature.

Practical experience has shown that with this arrangement, surprisingly, the thermal $NO_x$ development can be suppressed virtually entirely, even without a lateral spacing between the fuel supply and the air supply as they enter the heating chamber.

In principle, embodiments are also conceivable in which the fuel supply device has at least one fuel nozzle that is adjustable in the axial direction relative to the combustion chamber outlet, and this fuel nozzle can optionally be converted from a substantially radial outlet direction to an essentially axial outlet direction.

The combustion chamber outlet, which generates the jet or stream impetus in both operating states, can for example comprise a preferably concentric nozzle, so that the outlet has only one nozzle opening. If needed, this nozzle opening may also be located eccentrically to the fuel supply device. Embodiments are also conceivable in which the combustion chamber outlet has a plurality of nozzle openings annularly surrounding the fuel supply device.

Under some circumstances, it is advantageous if the combustion chamber has an outlet in the form of at least one outlet opening that in cross section is substantially cloverleaf-shaped and in which the fuel supply device is located. With this embodiment of the outlet opening, an especially advantageous compromise can be made between the above two variants. The resultant jet or stream in fact has a large surface area for aspirating combustion exhaust gases. Nevertheless, this type of outlet opening or openings can also easily be made in ceramic material. The fuel supply device, for instance in the form of the two concentric fuel lances, is as a rule located in the center of the outlet opening, but versions with an eccentric arrangement are also possible, for example in at least one of the "leaves" of the cloverleaf shape.

The fuel nozzle device, or in other words its nozzle outlet cross section in particular, is suitably formed and dimensioned such that the emerging fuel in the second operating state has at least substantially the same velocity as the combustion air flowing around the nozzle outlet opening or openings; as a result, the mixing between the fuel and the combustion air is delayed.

In the second operating state, the fuel nozzle is as a rule located in the region of the combustion chamber outlet. Especially with fuels that react sluggishly, such as natural gas, however, it can be set back somewhat into the combustion chamber without thereby causing flame formation in the combustion chamber itself. Conversely, instances are also conceivable in which the fuel nozzle protrudes from the combustion chamber, so that premixing of the combustion air with the combustion gases in the furnace is achieved before fuel is added to this mixture.

The switchover valves for the fuel nozzle devices for the first and second operating states may function in stepwise or continuous fashion. For the two operating modes, different fuels can also be used, although as a rule, for the sake of simplicity, only a single fuel will be used for both operating states.

The industrial burner can also be designed as a recuperator burner, where an integrated recuperator, through which the combustion air and combustion exhaust gases flow in countercurrent, is assigned to the combustion chamber. It is also possible to operate the burner with an external recuperator if needed, or with external air preheating.

In an alternative embodiment, the burner may also be designed as a regenerator burner, with an integrated, through which the combustion air and the combustion exhaust gases flow in alternation, being assigned to the combustion chamber; together with at least one further regenerator burner, it is employed to heat the heating chamber, and the two burners then operate in the heating and the regenerator mode in alternation.

The novel industrial burner can also, depending on the embodiment, be used either directly to heat the furnace chamber, or it may be followed in the outlet side by a radiator heating tube that is closed on the downstream end. In the embodiment as a regenerator burner, it may communicate with the further industrial burner via a tube downstream of the respective combustion chamber; the tube is advantageously essentially shaped into an O.

The fuels are preferably in gaseous form (such as natural gas, propane, etc.); liquid fuels (such as volatilized or atomized oil) or solid fuels (such as coal dust) may also be used, however.

DRAWINGS

The drawing shows exemplary embodiments of the subject of the invention.

DETAILED DESCRIPTION

Figure 1:
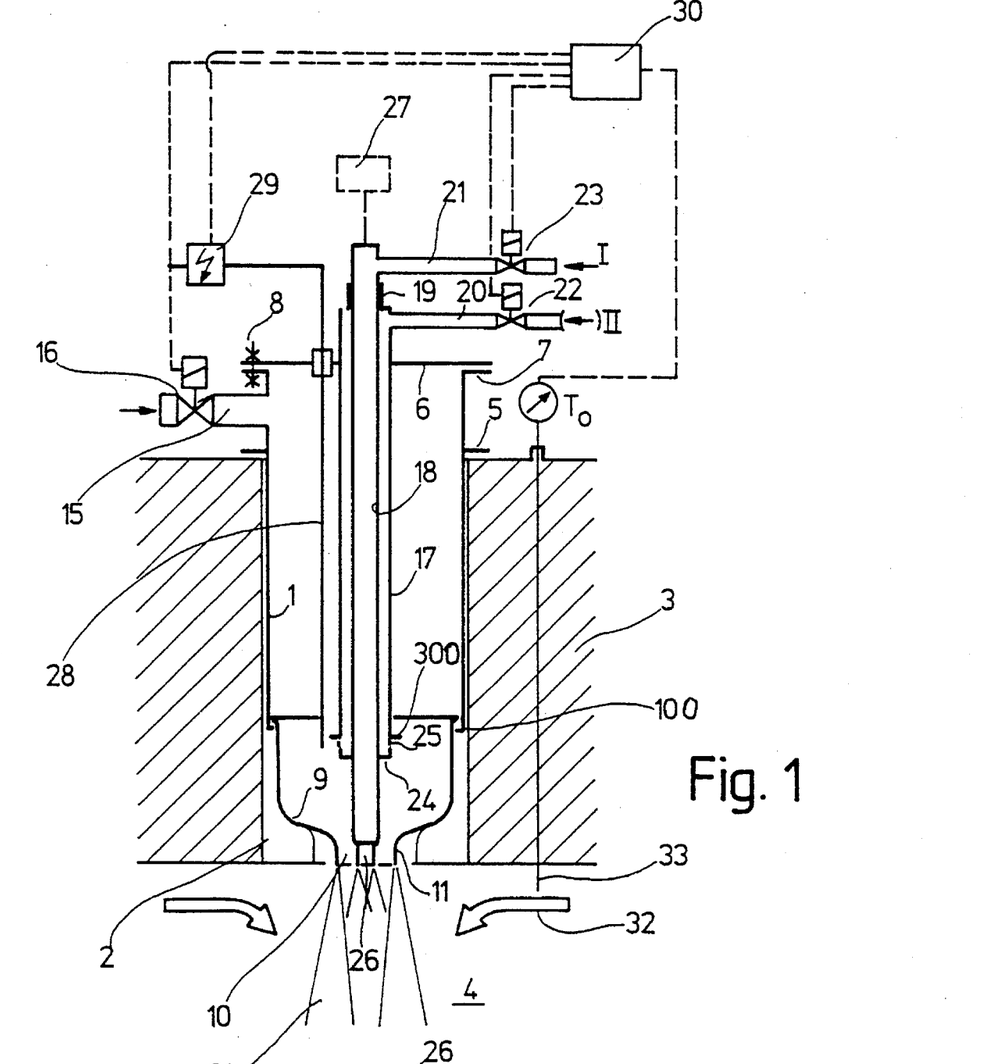
FIG. 1 is a side view in axial section of a first embodiment of an industrial burner according to the invention.
Figure 2:
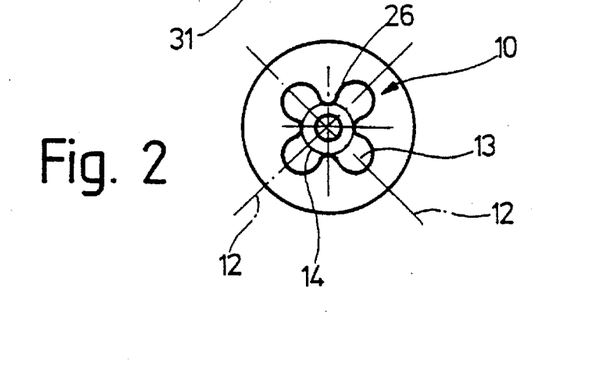
FIG. 2 is an outlet-side plan view of the combustion chamber of the industrial burner of FIG. 1.

The industrial burner shown in FIGS. 1, 2 is an impulse burner. It has a cylindrical jacket tube 1, made of steel or ceramic, with which it is inserted into a cylindrical opening 2, of suitable diameter, in a furnace wall 3; only a portion of this furnace wall is shown in FIG. 1, and it surrounds a furnace chamber 4, which in this case forms the chamber to be heated. The jacket tube 1 has an outer annular flange 5, with which it is sealed off from the furnace wall 3. On its outer end, it is closed by a cap 6, which is screwed in sealed fashion to an end flange 7, as schematically indicated at 8. Toward the furnace chamber 4, the jacket tube 1 is adjoined by a cup-shaped combustion chamber 9 of a high-heat-resistant material, especially ceramic, which is coupled at 100 with the jacket tube 1 in a sealed manner, via a corresponding flange connection.

The combustion chamber 9 of cylindrical cross section, which is coaxial with the jacket tube 1, is formed with an outlet, discharging into the furnace chamber 4, in the form of an outlet opening 10, which is bounded by a constriction 11 on the end of the combustion chamber wall and which, as can be seen from FIG. 2, has a substantially cloverleaf-shaped cross section. In the exemplary embodiment shown, the outlet opening 10 has four "leaves" the axes of which, suggested at 12, are at right angles to one another. These "leaves" are formed by pocket-shaped recesses 13, which protrude outward from an imaginary coaxial circle 14 Instead of four such "leaves" there may be more leaves (five or six for example) or fewer (two). The recesses 13 moreover need not have the outline shown in FIG. 2, which is essentially that of a part of a circle; for instance, they may instead have a triangular profile or some other profile.

A lateral air supply stub 15 is connected to the jacket tube 1 outside the furnace wall 3; a combustion air valve 16 is located in this stub 15, and optionally preheated combustion air can be supplied by way of the stub 15. The combustion air supply stub 15, together with the jacket tube 1 and the combustion air valve 16, forms the air supply device, which as seen from the drawing is shaped such that all the combustion air supplied acts upon the combustion chamber 9 and emerges from the outlet opening 10 thereof.

The combustion chamber 9 is also assigned a fuel supply device, which has two fuel lances 17, 18 coaxial with one another; the outer fuel lance 17 is retained in sealed fashion in the cap 6, and the inner fuel lance 18 is connected in sealed fashion at 19 to the outer fuel lance 17, which has a larger diameter. Two fuel supply stubs 20, 21 are connected to the two fuel lances 17, 18 outside the furnace wall 3; each fuel supply stub includes a fuel valve 22 and 23, respectively, and leads to fuel sources marked I and II, not shown in further detail in FIG. 1. Two different fuels can be supplied by the two fuel sources I and II; alternatively—and this is the usual situation—the two fuel sources I, II are combined into a single fuel source, which supplies only a single liquid or gaseous fuel.

The outer fuel lance 17 is closed on both face ends; it protrudes with its end 24 toward the furnace chamber into the combustion chamber 9. On this end, it is provided over its circumference with first fuel nozzles 25, which are oriented essentially radially and are spaced apart from the mouth of the outlet opening 10 by a relatively large distance.

The inner fuel lance 18 is extended in sealed fashion through the otherwise closed face end 24 of the outer fuel lance 17, and its end is provided with a constricted second fuel nozzle 26 whose mouth is located approximately at the level of the mouth of the outlet opening 10. The second fuel nozzle 26, whose outlet direction is substantially axial, discharges approximately at the level of the mouth of the outlet opening 10. Depending on the type of fuel used, the inner fuel lance 18 with its second fuel nozzle 26 may also, however, protrude axially somewhat beyond the mouth of the outlet opening 10 of the combustion chamber 9 into the furnace chamber 4, or may be set back relative to that mouth into the combustion chamber 9 by a certain amount. The first of these arrangements will be chosen especially whenever it is important, as a function of the conditions of use, first to attain a certain premixing of the combustion air emerging from the outlet opening 10 with the furnace exhaust gases contained in the furnace chamber 4, before fuel from the second fuel nozzle 26 is added to the exhaust gas and air mixture, while the second arrangement will be considered especially whenever the fuel supplied via the inner fuel lance 18 is relatively sluggish in reacting, as is true of natural gas, for example.

As an alternative or in addition, the inner fuel lance 18—optionally and/or the outer fuel lance 17—can in particular be axially adjustable; the associated adjuster is indicated at 27 in FIG. 1. In that case, the inner fuel lance 18 is supported displaceably in a sealed manner at 19, which is optionally also true for the leadthrough of the outer fuel lance 17 through the cap 6.

Laterally next to the outer fuel lance 17, an electrical ignition electrode 28 is also extended, in an electrically insulated manner, through the cap 6 and is connected to an electrical ignition source 29 that furnishes the requisite ignition pulses for igniting an air/fuel mixture present in the combustion chamber 9. The ignition electrode 28 cooperates in a manner known per se with an ignition flange 300, located in the combustion chamber 9, on the outside of the outer fuel lance 17 and together with this flange forms a part of the ignition device.

The ignition source 29, the combustion air valve 16, and the two fuel valves 22, 23 are controlled by a control unit 30, which makes it possible to turn the burner on and off and to perform the switchover between two operating states, as will be described below.

As can be seen from FIG. 2, the second fuel nozzle 26 is coaxial with the outlet opening 10. It should be noted in this connection that an eccentric location relative to the outlet opening 10 is also conceivable, and for certain usages it would also be possible to replace the second fuel nozzle 26 with a number of parallel-connected fuel nozzles, which would preferably be located in the "leaves" 13 of the cloverleaf-like outlet opening 10.

OPERATION

To start the burner from the cold state, the burner is first switched into a first operating state by the control unit 30. In this operating state, the combustion air valve 16 and the first fuel valve 22 of the outer fuel lance 17 are opened, while the second fuel valve 23 of the inner fuel lance 18 is closed. The combustion chamber 9 is thus acted upon by all the combustion air, which emerges with high impetus from the outlet opening 10 into the furnace chamber 4 in the form of an annular jet or, as indicated at 31.

The fuel introduced into the combustion chamber 9 through the radial nozzles 25 is mixed with the combustion air in the combustion chamber 9; the fuel/air mixture is ignited via the ignition electrode 28. It burns in the combustion chamber 9 with stable flame development, and the flame gases emerging through the outlet opening 10 heat up the furnace chamber 4. The injector action of the jet or stream emerging from the outlet opening 10 causes aspiration of the exhaust gases contained in the furnace chamber, as suggested by the arrows 32 shown in FIG. 1.

As soon as the furnace chamber 4 has been heated to the ignition temperature of the fuel assigned to the outer fuel lance 17, which is ascertained by a temperature sensor 33 protruding into the furnace chamber 4, the control unit 30 switches the burner over to a second operating state; to do so, it closes the first fuel valve 22 and opens the second fuel valve 23. This switchover may be done in stages or continuously.

In this second operating state, no further fuel is introduced into the combustion chamber via the radial nozzles 25, and as a consequence the combustion process in the combustion chamber 9 is essentially suppressed entirely. At the same time, fuel is now fed into the furnace chamber exclusively through the axial second fuel nozzle 26 that discharges into the furnace chamber 4 in the vicinity of the mouth of the outlet opening 10. Because of the injector action of the combustion air jet or stream outflowing at unreduced impetus from the outlet opening 10, a mixture of combustion exhaust gas and air into which the fuel is introduced forms in the furnace chamber 4 in the vicinity of the mouth of the outlet opening 10. Since the furnace chamber 4 has heated up to the ignition temperature of the fuel, the reaction of the fuel with the combustion air now takes place in a developing reaction zone in the furnace chamber 4 that is located outside the combustion chamber 9.

In this reaction zone, depending on the reaction conditions established, the reaction of the fuel with the combustion air can take place with flame development, but an essentially flame—and pulsation-free reaction can also be established.

$NO_x$ emissions in the first operating state, that is, the startup state, are already relatively slight; in any case, they are within the legally stated limits. In the second operating state, which is the normal operating state, $NO_x$ emissions are further lowered by from one to two orders of magnitude compared with conditions in the first operating state. Depending on the heating chamber temperature, they can even be lowered to the range below 1 ppm.

Figure 3:
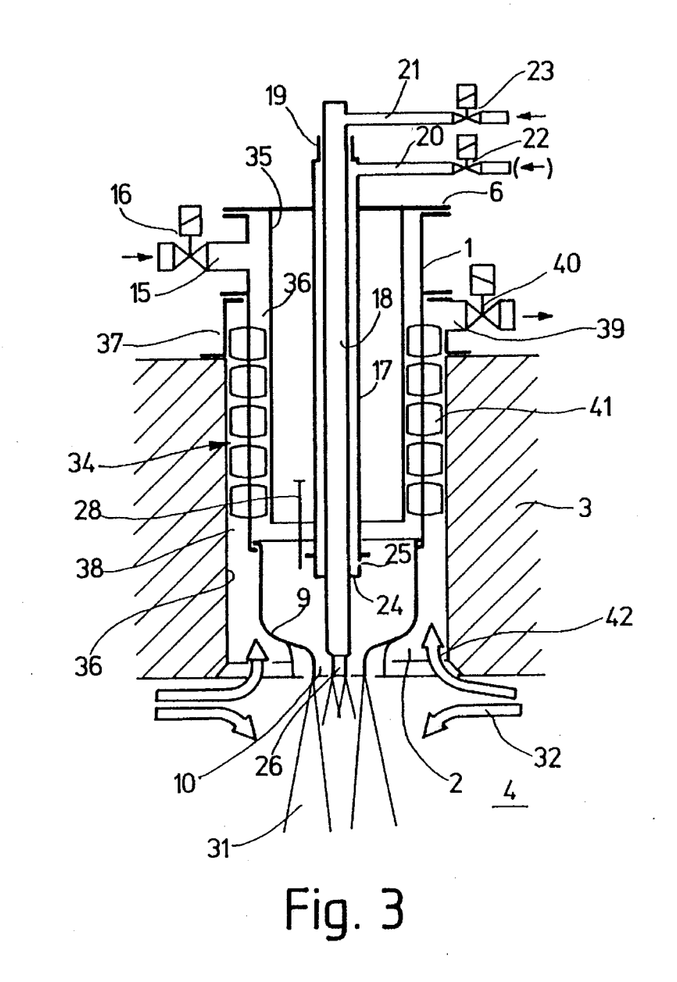
FIG. 3 shows an industrial burner according to the invention in an embodiment as a recuperator burner.

The impulse burner described in conjunction with FIGS. 1, 2 can also be constructed and operated as a recuperator burner without major expense for apparatus. This is illustrated in FIG. 3. In FIG. 3, identical elements to those of FIGS. 1, 2 are provided with the same reference numerals; to avoid repetition, they will not be described in detail again.

The recuperator burner of FIG. 3 is provided with an integrated ribbed recuperator 34, through which exhaust gases flowing out of the furnace chamber 4 and the inflowing combustion air flows in countercurrent. For that purpose, a coaxial air guide cylinder 35 connected in sealed fashion with the cap 6 is inserted into the jacket tube 1; together with the jacket tube 1, it defines an annular chamber 36 into which the air supply stub 15 discharges. Together with the inner wall 36 of the opening 2 in the furnace wall and with an exhaust gas hood 37 mounted on the outside of the furnace wall 3 in sealed fashion—or alternatively with an outer cylindrical wall that communicates with the exhaust gas hood 37—the jacket tube 1 defines an outer second annular chamber 38, which communicates with the furnace chamber 4 and to which an exhaust gas stub 39 is connected that discharges in the exhaust gas hood 37 and contains an exhaust gas valve 40. The jacket tube 1 has continuous heat exchanger ribs 41, which protrude into both annular chambers 36, 38 and which together with the intervening parts of the jacket tube provide for good heat transfer between the media flowing through the two annular chambers 36, 38.

Together with the air guide cylinder 35 and the inner wall 36—or the aforementioned outer cylindrical wall—the jacket tube 1 forms the integrated ribbed tube recuperator 34, in which the useful heat is extracted by the combustion air, flowing in countercurrent through the annular chamber 36, from the exhaust gases, suggested by arrows 42 and arriving from the furnace chamber 4 and flowing out through the exhaust gas stub 39.

In this embodiment as well, the combustion chamber 9 is acted upon by all the combustion air, which emerges through the outlet opening 10, formed as in FIG. 2, into the closed furnace chamber 4.

The burner again operates in the two operating states explained in conjunction with FIGS. 1, 2; in the first operating state, combustion with a stable flame takes place in the combustion chamber 9, and in the second operating state, the reaction between the fuel and the combustion air takes place outside the combustion chamber 9, in the furnace chamber 4. The control unit 30 of FIG. 1 is not shown again in FIG. 3, for the sake of simplicity.

Figure 4:
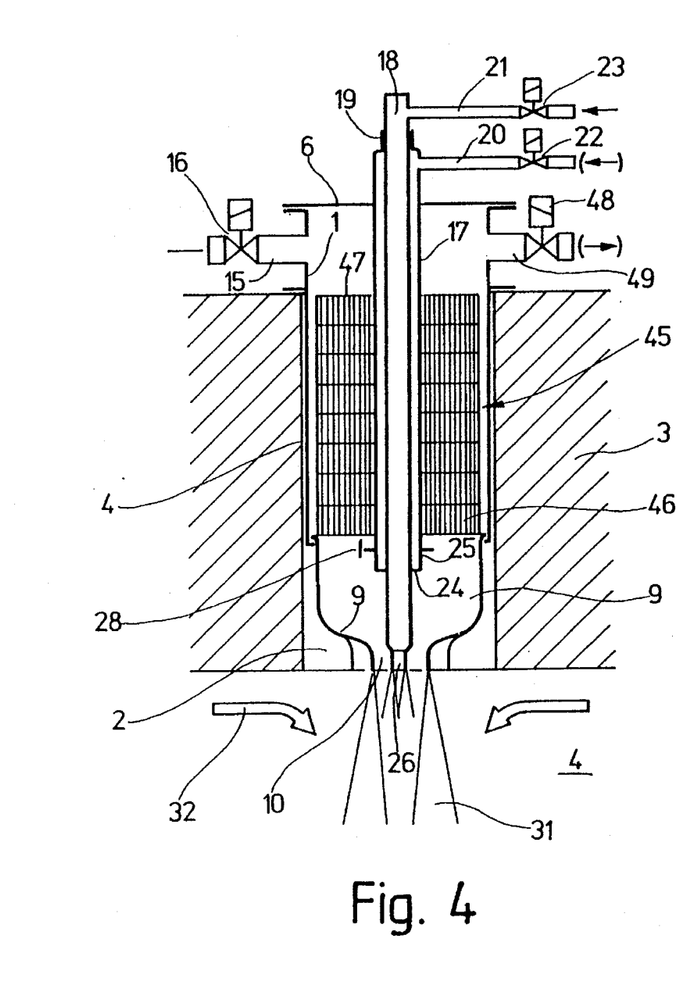
FIG. 4 in a side view in axial section, shows an industrial burner of the invention in an embodiment as a regenerator burner.

FIG. 4 shows the impulse burner of FIG. 1 in a modified embodiment as a regenerator burner. Once again, elements identical to those of FIGS. 1 and 2 are provided with the same reference numerals and not described again. A ceramic disk regenerator 45, which closes off the combustion chamber 9 at the top, is inserted above the combustion chamber 9 into the cylindrical annular chamber surrounded by the jacket tube 1 and the outer fuel lance 17. This regenerator 45 comprises a number of coaxial ceramic disks 46 stacked one above the other, which have narrow axial flow conduits 47 for gaseous media.

The regenerator burner is operated in batches in two operating cycles, as is generally known for regenerator burners. During a first operating cycle, hot furnace exhaust gases flow through the regenerator 45, with the supply of fuel and combustion air shut off; these exhaust gases, arriving from the furnace chamber 4, are drawn off through an exhaust gas stub 49 protruding laterally from the jacket tube 1 and including a valve 48. In the process, the exhaust gases give up their useful heat to the regenerator disks 46, and the regenerator 45 is thus heated up.

As soon as the regenerator 45 has heated up, the second operating cycle is initiated by closure of the exhaust gas valve 48 and opening of the combustion air valve 60; in this cycle, the combustion air flows through the regenerator disks 46 in the opposite direction, and thus the combustion air is preheated before its entry into the combustion chamber 9. The preheated combustion air emerges with high impetus through the nozzle-like constricted outlet opening 10 into the furnace chamber 4, in which by injection action, as suggested by the arrows 32, it aspirates furnace exhaust gases and mixes with them. Fuel is again introduced into the thus-formed mixture of combustion air and exhaust gas, via the axial fuel nozzle 26 of the inner fuel lance 18; this fuel reacts outside the combustion chamber 9 in the furnace chamber 4 with the combustion air, in an equivalent fashion to the second operating state of the burner already described.

The burner remains in this second operating state until such time as the quantity of heat stored in the regenerator has been consumed to such an extent that the regenerator must be heated up once again. Once that time is reached, the regenerator is transferred to the heating-up cycle again by closure of the combustion air valve 16 and opening of the exhaust gas valve 48, and simultaneous shutoff of the fuel supply.

To enable this kind of cyclic operation, the regenerator burner for heating the furnace chamber 4 cooperates with at least one further burner; during the heating-up cycle of the respective regenerator 45 of one burner, heating of the furnace chambers 4 takes place by at least one other burner, which as a rule is likewise formed as a regenerator burner.

In the startup mode, or in other words when the furnace chamber 4 is initially still cold, the regenerator burner initially operates without air preheating in the first operating state described in conjunction with FIGS. 1, 2, in which fuel supplied via the outer fuel lance 17 and the radial fuel nozzles 25 burns inside the combustion chamber 9 with the combustion air acting upon the combustion chamber, with stable flame development. As soon as the ignition temperature of the fuel is reached in the furnace chamber 4, at least one burner is switched over to the second operating state, in which the reaction of the fuel with the combustion air takes place outside the combustion chamber 9 in the furnace chamber 4. Even during the startup mode, the regenerator of a further burner is heated up. As soon as the regenerator 45 of that burner has heated up, it takes over heating of the furnace space, while the regenerator 45 of the first-mentioned burner is then transferred to the heating-up cycle, and so forth.

While in the embodiments of FIGS. 1–4 described above the outlet opening 10 of the combustion chamber 9 opens directly into the furnace chamber 4, so that in the second operating state the reaction between the fuel and the combustion air also takes place in the furnace chamber at a distance upstream of the combustion chamber 9, the novel burner principle can also readily be applied to burner models in which the furnace chamber 4 is heated indirectly via a radiator heating tube. In those cases, the actual heating chamber is located inside the closed-off radiator heating tube.

Figure 5:
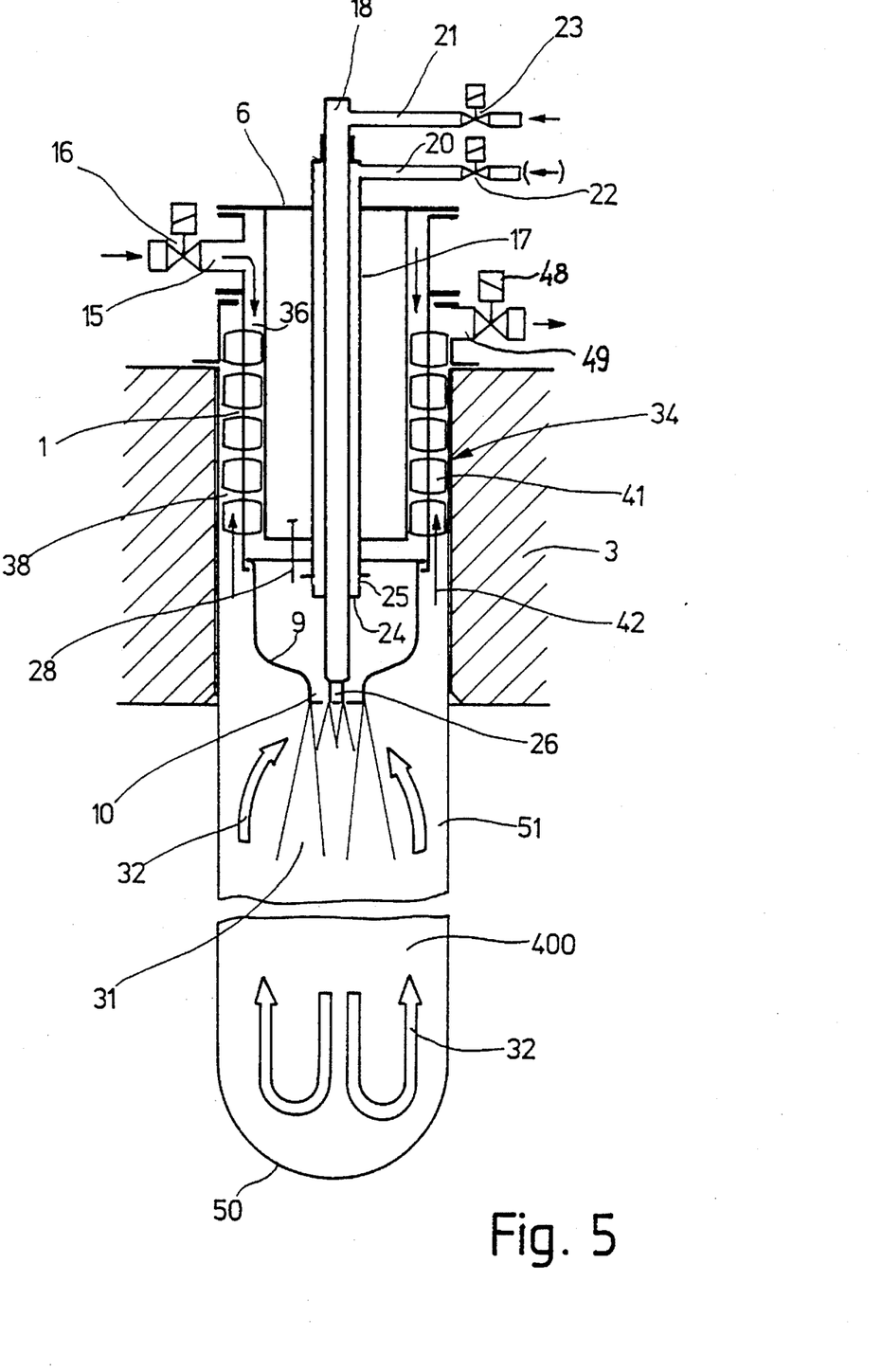
FIG. 5 in a side view in axial section, shows the industrial burner of FIG. 3 in a modified embodiment, with a radiator heating tube closed on its end.
Figure 6:
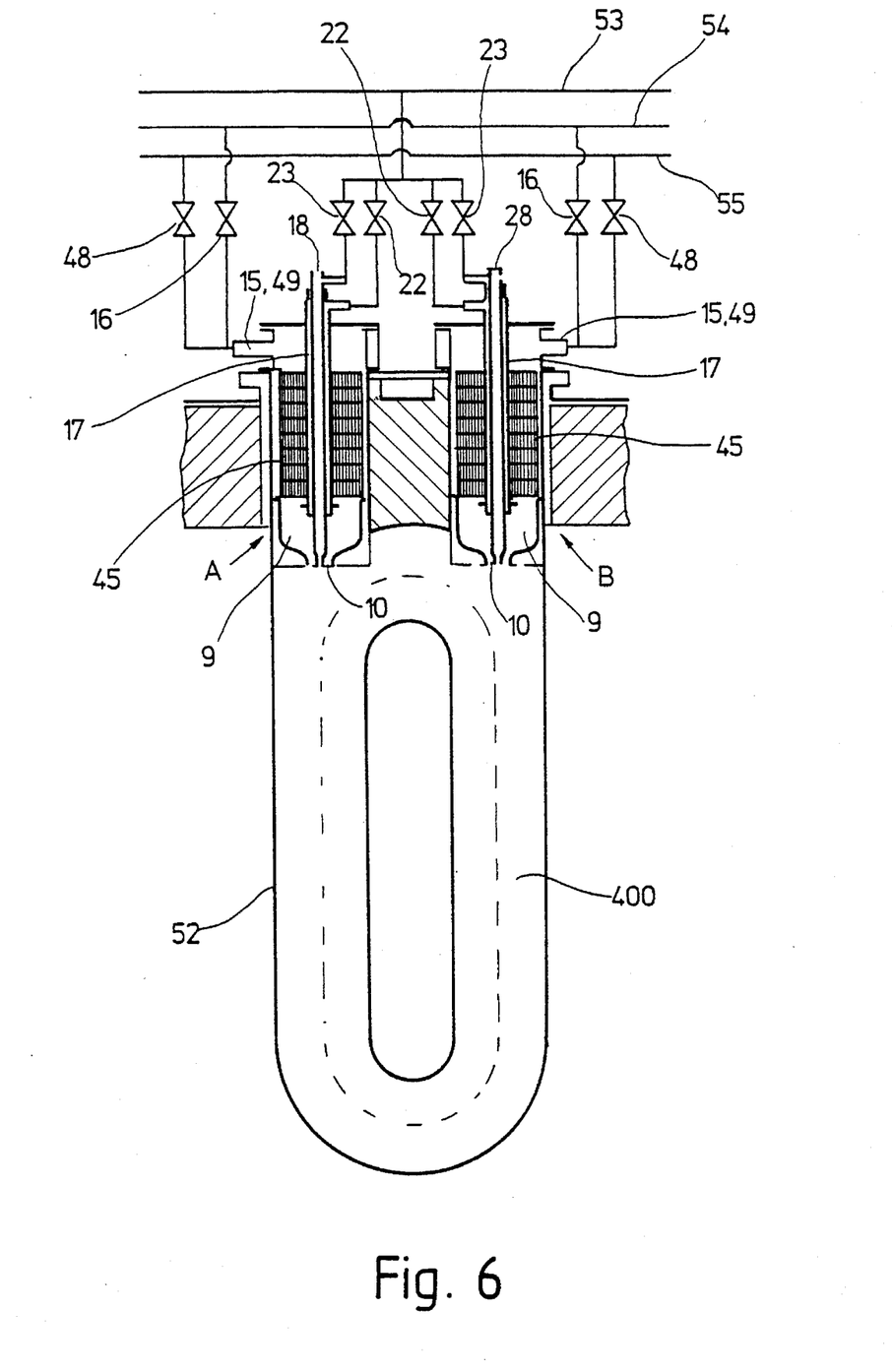
FIG. 6, in a side view in axial section, shows two industrial burners of FIG. 4 in a modified embodiment with a common radiator heating tube shaped into an 0.

Two examples of this type are shown in FIGS. 5, 6, in terms of modifications of the recuperator burner of FIG. 3 and the regenerator burner of FIG. 4. In FIGS. 5, 6, the same reference numerals as in FIGS. 3, 4 are used for identical parts. These parts will therefore not be described again here.

The recuperator burner shown in FIG. 5 differs from that of FIG. 3 only in that a cylindrical jacket radiator tube 51 closed at its end at 50 communicates in sealed fashion with the exhaust gas hood 37 and together with the jacket tube 1 defines the annular chamber 38 of the recuperator 34. The heating chamber 400 is formed by the interior of the jacket radiator tube 51, in which as a rule a coaxial ceramic flame tube is also included in a manner known per se; for the sake of simplicity, it has been left out of the schematic drawing.

Otherwise, the burner functions identically to the recuperator burner of FIG. 3 in two operating states. Reference may therefore be made to the description of FIG. 3 in this respect.

FIG. 6 shows a heater arrangement that comprises two regenerator burners of FIG. 4, but whose jacket tubes 1 communicate with one another through a tube 54 that is essentially shaped into an form and on its inside contains the heating chamber 400.

The two regenerator burners, which for the sake of better distinction are marked A and B, function in the heat up and in the air preheating cycle in alternation. While the regenerator burner A, for instance, with the regenerator 45 heated up is in the second operating state described in conjunction with FIGS. 1, 2, the quantity of exhaust gas to be carried outside is fed via the 0-shaped tube 52 to the second regenerator burner B, whose regenerator is thus heated up.

As soon as this heating up of the regenerator 45 of the second regenerator burner B has ended, both regenerator burners A, B are switched over to the respectively other cycle; that is, the regenerator burner B now takes on heating of the heating chamber 400, while in the regenerator burner A, the regenerator 45 fills up its heat reservoir.

The switchover of the two regenerator burners A, B between the two operating cycles, like the switchover between the first and second operating states as explained in conjunction with FIGS. 1, 2, is accomplished by suitable switchover of the fuel combustion air and exhaust gas valve 22, 23, 16 and 48, which as can be seen from FIG. 6 are each connected in groups to a common fuel line 53, a common combustion air line 54 and a common exhaust gas line 55. The heating apparatus shown in FIG. 6, with two regenerator burners, is especially economical in terms of its design and is therefore suitable even for lesser heat outputs on the order of magnitude of approximately 50 to 100 kW.

Figure 7:
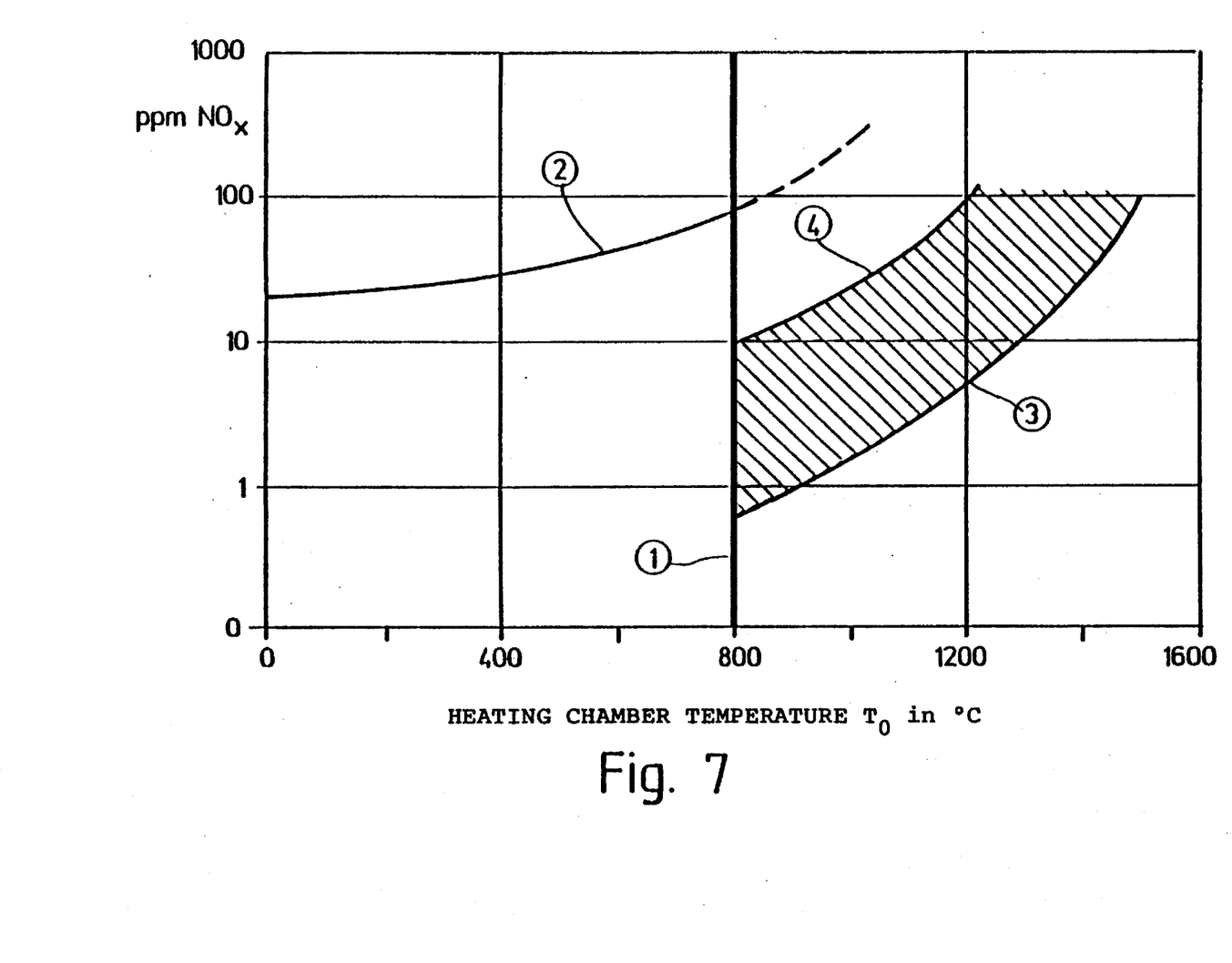
FIG. 7 is a diagram illustrating the $NO_x$ emissions of the industrial burner of FIG. 1 as a function of the heating chamber temperature.

Finally, the diagram of FIG. 7 shows the measurement values obtained for thermal $NO_x$ development in a practically embodied recuperator burner of FIG. 3.

An example of a recuperator burner has the following dimensions and operating data:

Gaseous fuel: natural gas

Air ratio: lambda≈1.1

Rated power: 30 kW

Air preheating: 0.7 times heating chamber temperature in °C.

Cross section of ombustion chamber nozzle (outlet opening 10): 3 cm$^2$

Cross section of the fuel nozzle (26) of the inner fuel lance (18): 0.3 cm$^2$

In the diagram, the thermal $NO_x$ development is plotted in ppm of $NO_x$ in the furnace exhaust gas, as a function of the heating chamber temperature measured by the temperature sensor 33 (FIG. 1). The lines plotted have the following meanings:

① switchover temperature from the first operating state to the second, 800° C.

② ppm of $NO_x$ in the first operating state (combustion with stable flame in combustion chamber 9)

③ ppm of $NO_x$ in the second operating state (reaction of the fuel with the combustion air in large furnace or heating chambers 4)

④ ppm of $NO_x$ in the second operating state (reaction of the fuel with the combustion air in the heating chamber of a radiator tube (150 mm in diameter) as in FIG. 4 with restricted exhaust gas recirculation)

The diagram shows that in the first or startup operating state, upon combustion of the fuel in the combustion chamber 9, an $NO_x$ emission occurs that is still far within the legally allowed limits.

Once the ignition temperature of the fuel in the heating chamber is attained and the switchover to the second operating state is made, the thermal $NO_x$ development is lowered by at least one order of magnitude over the first operating state.

The diagram thus shows that the thermal $NO_x$ development in the second operating state depends on the dimensions of the heating or reaction chamber. If there is free recirculation in a large heating chamber (>10 $dm^3$/kW), then $NO_x$ values <1 ppm were measured, as indicated by line ③. This means that compared with conditions in the first operating state (line ②), a lowering of $NO_x$ emissions by two orders of magnitude is achieved.

In situations where space is tighter, as can happen for instance with radiator tubes for indirect heating as shown in FIG. 4 (>1 $dm^3$/kW), $NO_x$ development rises at a heating chamber temperature of 800° C. to approximately 10 ppm (line ④). Nevertheless, it is still lower by one order of magnitude than line ② that applies to the first operating state.

Generally, at heating chamber temperatures above 1500° C., the $NO_x$ values rise sharply, because the nitrogen reacts with the oxygen in the air to an increasing extent even if a combustion reaction is not taking place.

Various changes and modifications may be made, and features described in connection with any of the embodiments may be used with any of the others, within the scope of the inventive concept.

I claim:

1. An industrial burner with low $NO_x$ emissions/s?/, particularly for heating furnace chambers (4) of industrial furnaces, having a high-heat-resistant combustion chamber (9) formed with at least one nozzle-shaped outlet (10) for gases emerging at high velocity into a heating chamber (4, 400);

a fuel supply device (17, 18, 20, 21, 22, 23, I, II);

an air supply device (15, 16);

an ignition device (28, 29, 300) for igniting a fuel/air mixture formed in the combustion chamber, wherein the fuel supply device (17, 18, 20, 21, 22, 23, I, II) has first (25) and second (26) nozzle devices;

the first nozzle device (25) and the second nozzle device (26) being located spatially separate from each other with respect to said nozzle-shaped outlet (10) from the combustion chamber (9);

control means (30, 22, 23) selectively controlling air flow from said air supply device (15, 16) and fuel flow to said first nozzle device (25) and the second nozzle device (26), said control means controlling, in a first operating state, air flow and fuel flow to said first nozzle device (25) to provide a fuel/air mixture in the combustion chamber which, upon ignition by said ignition device (28, 29, 300), at least partly burns therein with a stable flame, said control means further controlling, in a second operating state, air flow and fuel flow to said second nozzle device (26), whereby, at a temperature in the heating chamber (4, 400) which is above the ignition temperature of the fuel/air mixture, a reaction between the fuel and the combustion air inside the combustion chamber is essentially suppressed, and said reaction between the fuel and combustion air emerging at high outlet impetus from the nozzle-shaped outlet (10) of the combustion chamber is shifted into the heating chamber (4, 400);

wherein said air supply device, controlled by said control means (30, 22, 23), supplies air, at least in the second operating state, with such a high air throughput that, by means of the combustion air emerging from said nozzle-shaped outlet (10) of the combustion chamber (9), combustion exhaust gases from the heating chamber (4, 400) are aspirated by injector action and admixed with the combustion air in the combustion chamber (9).

2. The industrial burner of claim 1, wherein first nozzle device (25) discharges inside the combustion chamber (9) at a distance from the outlet (10) thereof and the second nozzle device 26 discharges inside or outside the combustion chamber (9) in the vicinity of the outlet (10), and wherein the control means includes valve means (22, 23) assigned to each of the two nozzle devices (25, 26).

3. The industrial burner of claim 2, characterized in that the fuel nozzle devices are formed on two concentric fuel lances.

4. The industrial burner of claim 2, characterized in that the fuel supply device has at least one radially oriented fuel nozzle.

5. The industrial burner of claim 2, characterized in that the fuel supply device has at least one axially oriented fuel nozzle.

6. The industrial burner of claim 1, characterized in that the outlet of the combustion chamber has only one nozzle opening, concentric with the fuel supply device.

7. The industrial burner of claim 1, characterized in that the outlet of the combustion chamber has a plurality of nozzle openings, annularly surrounding the fuel supply device.

8. The industrial burner of claim 1, characterized in that the combustion chamber has an outlet of substantially cloverleaf-like cross-sectional shape, in which the fuel supply device is located.

9. The industrial burner of claim 1, characterized in that the combustion chamber is followed on the outlet side by a radiator heating tube, which is closed on its far end.

10. The industrial burner of claim 1, characterized in that it is connected to a further industrial burner via a tube, which is essentially shaped into an 0, downstream of the respective combustion chamber.

11. The industrial burner of claim 1, wherein the air supply device (15, 16) supplies air with a level of air flow such that essentially all the combustion air is aspirated into the combustion chamber.

12. The industrial burner of claim 1, further comprising position adjustment means (18, 20) coupled to at least one (26) of said fuel nozzle devices for relatively adjusting the respective fuel nozzle device, axially, with respect to the outlet (10) of said combustion chamber (9).

13. The industrial burner of claim 2, further comprising individual fuel supply means (20, 21) coupled to the respective fuel nozzle devices (25, 26) to permit supply of different fuels to the respective fuel nozzle devices (25, 26).

14. The industrial burner of claim 1, wherein said control means (30, 22, 23) controls fuel flow through said second fuel device, and air flow into said combustion chamber (9) and emerging from said nozzle-shaped outlet (10) to have, essentially, the same velocity.

15. The industrial burner of claim 1, wherein said control means (30, 22, 23) controls said air flow and fuel flow in the respective two respective operating stages to control air flow and fuel flow continuously, or in steps, between said two operating states.

16. The industrial burner of claim 1, further comprising a recuperator (34), coupled to the combustion chamber (9) and integrated therewith;

and ducting or baffle means directing, respectively, combustion air and combustion exhaust gases in counter current flow through said recuperator.

17. The combination of at least two industrial burners (A, B), each as claimed in claim 1, each of said burners including a regenerator (45), said regenerators being in fluid communication with, respectively, the combustion air and the combustion exhaust gases;

and gas flow control means (16, 48) controlling, respectively, combustion air flow and combustion exhaust gas flow through the respective regenerators (45), whereby alternate operation of said industrial burners in heating mode, or regenerator mode, can be obtained.

18. The combination of claim 17, further including a connection tube coupling said at least two industrial burners (A, B) together, said connection tube being essentially, in plan view, of 0 configuration and coupled to the nozzle-shaped outlets (10) of said combustion chambers (9) of said at least two industrial burners (A, B).

19. A method of operating an industrial burner to have low $NO_x$ emission, particularly for heating furnace chambers (4) of industrial furnaces, said burner having a high-heat-resistant combustion chamber (9) formed with at least one nozzle-shaped outlet (10) for gases emerging at high velocity into a heating chamber (4, 400);

a fuel supply device (17, 18, 20, 21, 22, 23, I, II);

an air supply device (15, 16);

an ignition device (28, 29, 300) for igniting a fuel/air mixture formed in the combustion chamber, wherein the fuel supply device (17, 18, 20, 21, 22, 23, I, II) has first (25) and second (26) nozzle devices;

the first outlet nozzle (25) and the second nozzle (26) device being located spatially separate from each other with respect to said nozzle-shaped outlet (10) from the heating chamber;

comprising the steps of controlling air flow from said air supply device (15, 16) to the combustion chamber (9);

controlling fuel flow to the first nozzle device (25);

controlling fuel flow to the said second nozzle device (26), said controlling steps including a first controlled operating state, in which fuel is controllably introduced to the first nozzle device (25) and hence into the combustion chamber (9) to produce a fuel/air mixture which, upon ignition by said ignition device (28, 29, 300), at least partly burns in the combustion chamber with a stable flame; and a second controlled operating state in which, when the temperature in the heating chamber has reached a level above the ignition temperature of the fuel/air mixture, fuel is controllably supplied to the second nozzle device (26), and controlling fuel flow and air flow to obtain a reaction between the fuel and combustion air emerging at high outlet impetus from the outlet (10) of the combustion chamber, and substantially suppressing combustion within the combustion chamber (9), while shifting combustion to the heating chamber (4, 400), said controlling step controlling the air flow throughput such that the combustion air emerging from the combustion chamber outlet (10) causes combustion exhaust gases to be aspirated from the heating chamber, by injector action, into said combustion chamber (9) and admixed therein with the combustion air.

20. The method of claim 19, including, in the second state, the step of controlling the velocity of combustion air emerging from the outlet (10) of the combustion chamber (9) and fuel flow from the second fuel nozzle device (26) such that said velocities are at least substantially the same.

21. A method of operating two industrial burners, as claimed in claim 17, comprising the steps of passing combustion air and combustion exhaust gases while one of said regenerator burners (A) is in the second operating state to another (B) of said at least two regenerator burners, to thereby heat the regenerator of said other burner, and when said other burner is in the first operating state, alternately switching the operating states of said at least two regenerator burners (A, B), and filling the heat reservoirs of said regenerator burners, alternately.

\* \* \* \* \*